United States Patent

[11] 3,593,040

[72] Inventor Donald E. Graham
Bellbrook, Ohio
[21] Appl. No. 879,700
[22] Filed Nov. 25, 1969
[45] Patented July 13, 1971
[73] Assignee General Motors Corporation
Detroit, Mich.

[54] FAST RISE ELECTRIC TRIGGER PULSE CIRCUIT
5 Claims, 3 Drawing Figs.
[52] U.S. Cl. .................................................. 307/252,
307/284, 307/290, 307/305
[51] Int. Cl. ............................................ H03k 17/00,
H03k 3/26
[50] Field of Search .......................................... 307/252.51,
252.70, 305, 284, 290, 291

[56] References Cited
UNITED STATES PATENTS
3,320,440 5/1967 Reed ............................. 307/284
3,329,887 7/1967 Schaeue ....................... 307/305

Primary Examiner—John S. Heyman
Assistant Examiner—David M. Carter
Attorneys—Eugene W. Christen, Creighton R. Meland and Richard G. Stahr ABSTRACT: A fast rise electric trigger pulse circuit for producing a fast rise electric pulse for triggering a silicon controlled rectifier into an electrical load. The gate and cathode electrodes of the silicon controlled rectifier are connected to the positive polarity terminal of a source of direct current potential through separate, parallel resistors and the cathode electrode is also connected to the negative polarity terminal of the source of direct current potential through the collector-emitter electrodes of a normally not-conducting transistor. An externally generated electrical signal triggers a monostable multivibrator circuit to the alternate state which produces an electrical control signal of a substantially constant magnitude for a predetermined duration. The control signal is applied across the base-emitter electrodes of the transistor through a coupling circuit which reduces the magnitude of the control signal across the base-emitter electrodes over a predetermined time interval in the polarity relationship which will initiate collector-emitter current flow through the transistor to connect the gate-cathode electrodes of the silicon control rectifier across the source of direct current potential.

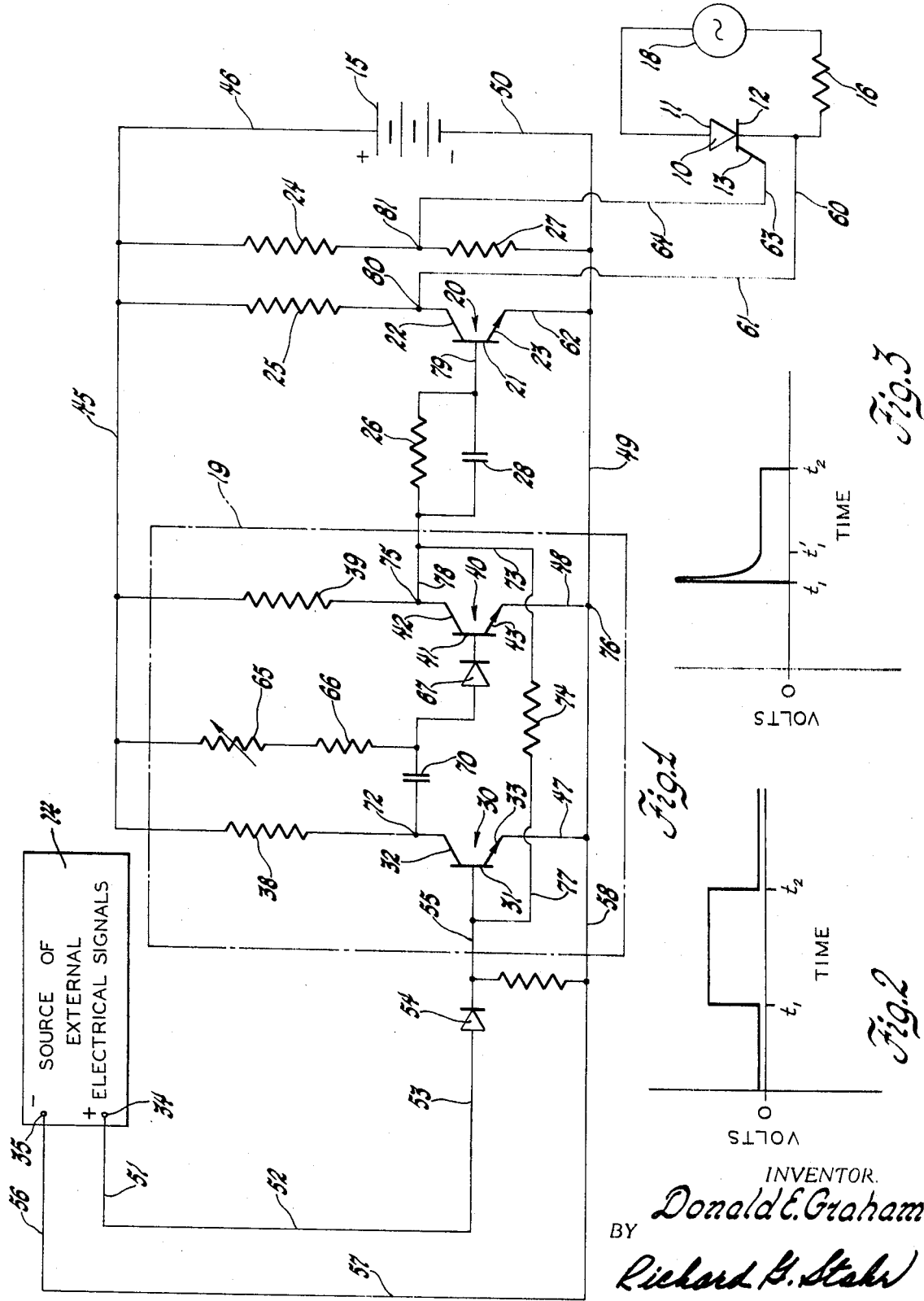

FAST RISE ELECTRIC TRIGGER PULSE CIRCUIT

The present invention relates to a circuit for producing a fast rise electric trigger pulse for triggering a silicon controlled rectifier into an electrical load.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction through the anode-cathode electrodes upon the application across the control-cathode electrodes, of a control signal of a polarity which is positive at the control electrode with respect to the cathode electrode and of sufficient magnitude to produce control-cathode electrode, or gate, current.

Initially, current flow through the silicon controlled rectifier is concentrated within a small area which expands with time until current flows across substantially the entire conductive area of the device. Therefore, when a silicon controlled rectifier is switched into loads which permit an extremely rapid rise of load current, the silicon controlled rectifier may break down because of the excessive current flow through the initially small conductive area, thereby destroying the device. This is particularly true of power silicon controlled rectifiers employed to switch considerable in-rush or initial current which are triggered to conduction by relatively weak control signal pulses. One method of preventing the destruction of a power silicon controlled rectifier switching into electrical loads of this type is to provide a control signal in the form of a pulse which rapidly rises to a level of sufficient magnitude to rapidly expand the area of conduction to a degree sufficient to safely carry the load current.

For a silicon controlled rectifier to remain conductive after an electrical control signal applied across the gate-cathode electrodes thereof in the proper polarity relationship is removed, it is necessary that the anode-cathode current flow through the device be of sufficient magnitude required to maintain conduction therethrough. The current magnitude required to maintain the device conductive is commonly called the "hold-in" current and is dependent upon the characteristic of the device. Therefore, when a silicon controlled rectifier is switched into loads which permit only a slow rise of load current through the anode-cathode electrodes, the device may not remain conductive upon the removal of the control signal should the control signal be of insufficient duration to permit the buildup of load current through the anode-cathode electrodes to reach a magnitude which will maintain the device conductive.

It is, therefore, an object of this invention to provide an improved fast rise electric trigger pulse circuit for triggering a silicon controlled rectifier into any type electrical load.

In accordance with this invention, a circuit for producing fast rise electric trigger pulses for triggering a silicon controlled rectifier to any type electrical load is provided wherein the cathode electrode of the silicon controlled rectifier, having the gate and cathode electrodes thereof connected to the positive polarity terminal of a source of direct current potential through separate parallel impedance elements, is connected to the negative polarity terminal of the source of direct current potential through the current carrying electrodes of a normally not conducting transistor when triggered conductive by a control signal of a substantially constant magnitude for a predetermined duration applied across the control electrode and one of the current carrying electrodes thereof through a coupling circuit which reduces the magnitude of the control signal across the base electrode and the one current carrying electrode over a predetermined time interval.

For a better understanding of the present invention, together with additional objects, advantages, and features thereof, reference is made to the following description and accompanying drawings in which:

FIG. 1 sets forth the fast rise electric trigger pulse circuit of this invention in schematic form;

FIG. 2 sets forth the signal wave form produced by the control signal circuit of FIG. 1; and FIG. 3 sets forth the fast rise electric trigger signal pulse produced by the circuit of this invention.

Referring to FIG. 1, the novel fast rise electric trigger pulse circuit of this invention is set forth in schematic form in combination with a silicon controlled rectifier 10 having anode electrode 11, a cathode electrode 12, and a gate electrode 13, a source of externally generated electrical signals 14 which, since it may be any one of several signal sources of this type well-known in the art, has been indicated in block form and a source of direct current potential, which may be a conventional storage battery 15.

The anode electrode 11 and cathode electrode 12 of silicon controlled rectifier 10 are shown in FIG. 1 to be connected in series with an electrical load, indicated in FIG. 1 as a resistor 16 but which may be any type electrical load, across a source of alternating current potential 18 which, since it may be any conventional alternating current potential source and forms no part of this invention, has been symbolically illustrated.

Briefly, the novel fast rise trigger pulse circuit of this invention comprises a control signal circuit responsive to an externally generated electrical signal for producing an output electrical control signal of a substantially constant magnitude for a predetermined duration, one example of which is the monostable multivibrator circuitry included within dashed rectangle 19; a normally not conducting transistor having a control electrode and two current carrying electrodes, may be a type NPN transistor 20 having base 21, collector 22, and emitter 23 electrodes; separate parallel circuits, each including at least one impedance element which may be respective resistors 24 and 25, for connecting the gate and cathode electrodes of silicon controlled rectifier 10 to the positive polarity terminal of the source of direct current potential; coupling circuitry for applying the electrical control signal across the control electrode and a selected one of the current carrying electrodes of the normally not conducting transistor in a polarity relationship which will initiate conduction through the current carrying electrodes thereof and circuitry included in the coupling circuitry, which may be the parallel combination of resistor 26 and capacitor 28, for reducing the magnitude of the electrical control signal across the control electrode and the selected one current carrying electrode of the transistor over a predetermined time interval.

The source of externally generated electrical signals 14 may be of the type which produces electrical signals across the output terminals 34 and 35 thereof of a positive polarity upon output terminal 34 with respect to output terminal 35. As the source of externally generated electrical signals 14 may be any one of several well known in the art, and, per se, forms no part of this invention, it has been indicated in block form in FIG. 1 in the interest of reducing drawing complexity.

Without intention or inference of a limitation thereto, the control signal circuit 19 may be a conventional monostable multivibrator circuit comprising type NPN transistor 30 having a base electrode 31, a collector electrode 32 and an emitter electrode 33, type NPN transistor 40 having a base electrode 41, collector electrode 42, and an emitter electrode 43, and the associated interconnecting circuitry. The collector-emitter electrodes of transistors 30 and 40 are connected across battery 15 through respective resistors 38 and 39 and common leads 45 and 46 and through respective leads 47 and 48 and common leads 49 and 50 in the correct polarity relationship for collector-emitter current flow from battery 15 through a type NPN transistor.

The externally generated electrical signals produced by source 14 are applied to the control signal circuit 19 through leads 51, 52 and 53, diode 54 and lead 55, which connect the positive polarity output terminal 34 thereof to the base electrode 31 of transistor 30 and through leads 56, 57, 58 and 47, which connect the negative polarity output terminal 35 thereof to the emitter electrode 33 of transistor 30.

The gate 13 and cathode 12 electrodes of silicon controlled rectifier 10 are connected to the positive polarity terminal of battery 15 through separate parallel circuits, each including at least one impedance element, and the cathode electrode 12 of silicon controlled rectifier 10 is also connected to the negative polarity terminal of battery 15 through the current carrying electrodes of transistor 20.

Referring to FIG. 1, resistor 25 and the collector emitter electrodes of transistor 20 are shown to be connected in series across battery 15 and resistors 24 and 27 are shown to be connected in series across battery 15 through leads 45 and 46 and leads 49 and 50. The cathode electrode 12 of silicon controlled rectifier 10 is connected to junction 80 between series connected resistor 25 and the collector-emitter electrodes of resistor 20 through leads 60 and 61 and the gate electrode 13 of silicon controlled rectifier 10 is connected to junction 81 between series connected resistors 24 and 27 through leads 63 and 64.

With this circuit arrangement, cathode electrode 12 of silicon controlled rectifier 10 is connected to the positive polarity terminal of battery 15 through leads 60 and 61, resistor 25 and leads 45 and 46 and gate electrode 13 is connected to the positive polarity terminal of battery 15 through leads 63 and 64, resistor 24, and leads 45 and 46 and the cathode electrode 12 is also connected to the negative polarity terminal of battery 15 through the current carrying electrodes of the normally not conducting transistor 20 through leads 60 and 61, the collector emitter electrodes of transistor 20 and leads 62, 49 and 50.

Resistor 27 is selected to be of an ohmic value which will provide a potential drop thereacross which is compatible with the gate-cathode potential characteristic of the device selected as silicon controlled rectifier 10. Resistor 27 may be omitted from this circuit should the gate-cathode junction characteristic of the device selected as silicon controlled rectifier 10 be capable of accommodating the full potential of battery 15 less the drop across resistor 24. As another alternative, resistor 27 may be a variable resistor which may be adjusted to provide a wide range of potential drops thereacross to accommodate a wide variety of devices which may be selected as silicon controlled rectifier 10.

The collector-emitter electrodes of transistor 20 are connected across battery 15 through resistor 25 and leads 45 and 46, which connect collector electrode 22 to the positive polarity terminal of battery 15, and through leads 62, 49 and 50, which connect emitter electrode 23 to the negative polarity terminal of battery 15, in the correct polarity relationship for collector emitter flow from battery 15 through a type NPN transistor.

The electrical control signal produced by control signal circuit 19 appears across junctions 75 and 76 and is of a positive polarity upon junction 75 with respect to junction 76, in a manner to be later explained. This electrical control signal is applied across the control electrode, base electrode 21, and a selected one of the current carrying electrodes, emitter electrode 23, of transistor 20 in a polarity relationship which will initiate conduction through the current carrying electrodes thereof, collector electrode 22 and emitter electrode 23, through lead 78, the parallel combination of resistor 26 and capacitor 28 and lead 79, which connects junction 75 to the base electrode 21 of transistor 20, and through leads 49 and 62, which connect junction 76 to the emitter electrode 23 of transistor 20.

The parallel combination of resistor 26 and capacitor 28 operates to reduce the magnitude of the electrical control signal produced by control signal circuit 19 across the control electrode and the emitter electrode of transistor 20 over a predetermined time interval in a manner to be later explained.

Upon the application of the potential of battery 15 across control signal circuit 19, base-emitter current flows through transistor 40 through a circuit which may be traced from the positive polarity terminal of battery 15 through leads 46 and 45, variable resistor 65, fixed resistor 66, diode 67, the base emitter junction of transistor 40 and leads 48, 49, and 50 to the negative polarity terminal of battery 15 and capacitor 70 charges through a circuit which may be traced from the positive polarity terminal of battery 15 through leads 46 and 45, fixed resistor 38, capacitor 70, diode 67, the base-emitter junction of transistor 40 and leads 48, 49 and 50 to the negative polarity terminal of battery 15. Upon being charged through the circuit just described the plate of capacitor 70 connected to junction 72 between resistor 38 and the collector electrode 32 of transistor 30 is of a positive polarity with respect to the other plate. The base-emitter current flow through transistor 40 initiates collector-emitter current flow from battery 15 through this device through a circuit previously described. With transistor 40 conducting through the collector-emitter electrodes, the output control signal potential appearing across junctions 75 and 76 is of a very low magnitude, being equal to the drop across conducting transistor 40, as shown in FIG. 2.

Each externally generated electrical signal appearing across output terminals 34 and 35 of source of external electrical signals 14 produces base-emitter current flow through transistor 40 of control signal circuit 19 through a circuit which may be traced from the positive polarity output terminal 34 of external signal source 14 through leads 51, 52 and 53, diode 54, lead 55, the base-emitter junction of transistor 30 and leads 47, 58, 57 and 56 to the negative polarity terminal 35 of source of external electrical signals 14. This flow of base-emitter current flow through transistor 30 initiates collector-emitter current flow through transistor 30 from battery 15 through a circuit previously described. Conducting transistor 30 establishes a discharge circuit for capacitor 70 in an inverse polarity relationship across the emitter-base junction of transistor 40 and establishes a circuit which may be traced from the positive polarity terminal of battery 15, through leads 46 and 45, variable resistor 65, fixed resistor 66, capacitor 70, the collector-emitter electrodes of transistor 30 and leads 47, 49 and 50 to the negative terminal of battery 15 through which capacitor 70 may charge in the other or second direction. While capacitor 70 is charging through this circuit, base drive current is shunted from the base-emitter electrodes of transistor 40. The combined action of discharging capacitor 70 and the shunting of base drive current from transistor 40 abruptly extinguishes this device. With transistor 40 not conducting, a circuit is established for base-emitter current flow from battery 15 through transistor 30 which may be traced from the positive polarity terminal of battery 15, through leads 46 and 45, resistor 39, lead 78, lead 73, resistor 74, lead 77, the base emitter junction of transistor 30, and leads 47, 49 and 50 to the negative polarity terminal of battery 15, consequently, transistor 30 is maintained conductive through the collector emitter electrodes after the removal of the externally generated electrical signal from across the base-emitter electrodes thereof while transistor 40 is not conducting. When capacitor 70 has become fully charged in the second direction through the circuit previously described, base drive current is no longer shunted from transistor 40, consequently, base-emitter current again flows through this device to initiate collector-emitter current flow therethrough. When transistor 40 goes conductive after capacitor 70 has become charged in the second direction, the base drive current supplied to transistor 30 through the circuit including resister 74 is shunted from transistor 30 through conducting transistor 40, consequently, transistor 30 extinguishes and the control signal circuit is reset for the next externally generated electrical signal from source 14. As transistor 40 is abruptly extinguished in the manner hereinabove described, the potential appearing across junctions 75 and 76 abruptly changes from a low value to a magnitude substantially equal to the potential magnitude of battery 15 to produce the substantially vertical leading edge of the control signal as shown at time $t_1$ in FIG. 2. While transistor 40 remains not conductive during the time capacitor 70 is charging, the magnitude of the control signal remains substantially constant across junctions 75 and 76, as shown between times $t_1$ and $t_2$ of FIG. 2. When transistor 40 goes conductive upon the completion of the charge of capacitor 70, the potential appearing across junctions 75 and 76 abruptly falls to a magnitude substantially equal to the drop across conducting transistor 40 to produce a substantially equal vertical trailing edge of the control signal as shown at time $t_2$ in FIG. 2.

From this description, it is apparent that control signal circuit 19 produces a control signal having substantially vertical leading and trailing edges and of a substantially constant magnitude for the duration of time during which transistor 40 is not conducting.

The period of time during which transistor 40 is not conducting is determined by the time required for capacitor 70 to become charged in the second direction through conducting transistor 30 which is dependent upon the time constant of the charging circuit. Consequently, the period of time during which transistor 40 is in the not conducting state may be varied by adjusting variable resistor 65 to change the time constant of the charging circuit for capacitor 70. Therefore, by adjusting the value of variable resistor 65, the duration of the control signal may be predetermined. This control signal is applied across the base-emitter electrodes of transistor 20 through a circuit previously described, in the correct polarity relationship to produce base-emitter current flow through this type NPN transistor. With the initiation of the control signal, capacitor 28 appears as a short circuit in shunt with resistor 26. Consequently, substantially the full potential magnitude of the leading edge of the control signal appearing across junctions 75 and 76 is applied across the base-emitter junction of transistor 20. Transistor 20 is selected to be driven into saturation by the available control signal magnitude to produce the fast rise spike of the leading edge of the electrical trigger signal appearing across junction 80 and 81, as shown in FIG. 3. As capacitor 28 charges, the magnitude of the control signal applied across the base-emitter junction of transistor 20 is reduced over the time interval between times $t_1$ and $t'_1$ of FIG. 3 as determined by the time constant of the charging circuit for capacitor 28 which includes resistor 26, capacitor 28 and the base-emitter junction of transistor 20. By properly selecting the values of resistor 26 and capacitor 28, the time interval over which the magnitude of the control signal is reduced may be predetermined. After capacitor 28 has become fully charged, resistor 30 becomes effective to maintain the magnitude of the control signal applied across the base-emitter junction of transistor 20 substantially constant to provide the substantially constant trailing edge of the electric trigger signal appearing across junctions 80 and 81, as shown in FIG. 3.

The high leading edge spike of the trigger signal is of sufficient magnitude to rapidly expand the conducting surface of silicon controlled rectifier 10 if switched into a high di/dt load and the substantially constant trailing edge of the trigger signal maintains the control signal across the gate-cathode electrodes of silicon controlled rectifier 10 for a period of time long enough to permit the lead current therethrough to reach the holding current magnitude of the device selected as silicon controlled rectifier 10 when switched into a highly inductive load.

Not only does the novel trigger pulse circuit of this invention produce a fast rise trigger pulse which will initiate conduction through a silicon controlled rectifier and maintain the control signal for a sufficient duration of time to permit the buildup of holding current therethrough but, between trigger signals, maintains a reverse potential across the gate-cathode electrodes of silicon controlled rectifier 10 since both the cathode and gate electrodes thereof are connected to the positive polarity terminal of battery 15 while transistor 20 is in the not conducting state. With this arrangement, a reverse bias is placed across the gate-cathode electrodes of the silicon controlled rectifier which prevents the false triggering thereof by spurious or transient signals in the system.

While specific elements and compatible polarity relationships have been set forth in this specification, it is to be specifically understood that alternate electrical circuit elements having similar electrical characteristics and compatible polarities may be substituted therefor without departing from the spirit of the invention.

What I claim is:

1. A fast rise electric trigger pulse circuit for producing a fast rise electric pulse for triggering a silicon controlled rectifier into an electrical load comprising in combination with a silicon controlled rectifier having an anode, a cathode and a gate electrode and a source of direct current potential;

control signal circuit means responsive to an externally generated electrical signal for producing an output electrical control signal of a substantially constant magnitude for a predetermined duration, means for applying externally generated electrical signals to said control signal circuit means, a normally not conducting transistor having a control electrode and two current carrying electrodes, separate parallel circuit means, each including at least one impedance element, for connecting said gate and cathode electrodes of said silicon controlled rectifier to the positive polarity terminal of said source of direct current potential, means for connecting said cathode electrode of said silicon controlled rectifier to the negative polarity terminal of said source of direct current potential through said current carrying electrodes of said transistor, coupling circuit means for applying said electrical control signal across said control electrode and a selected one of said current carrying electrodes of said transistor in a polarity relationship which will initiate conduction through said current carrying electrodes thereof, and means included in said coupling circuit means for reducing the magnitude of said electrical control signal across said control electrode and a selected one of said current carrying electrodes of said transistor over a predetermined time interval.

2. A fast rise electric trigger pulse circuit for producing a fast rise electric pulse for triggering a silicon controlled rectifier into an electrical load comprising in combination with a silicon controlled rectifier having an anode, a cathode and a gate electrode and a source of direct current potential;

control signal circuit means responsive to an externally generated electrical signal for producing an output electrical control signal of a substantially constant magnitude for a predetermined duration, means for applying an externally generated electrical signal to said control signal circuit means, a normally not-conducting transistor having collector, emitter and base electrodes, separate parallel circuit means each including at least one resistor for connecting said gate and cathode electrodes of said silicon controlled rectifier to the positive polarity terminal of said source of direct current potential, means for connecting said cathode electrode of said silicon controlled rectifier to the negative polarity terminal of said source of direct current potential through said collector-emitter electrodes of said transistor, and coupling circuit means including the parallel combination of a resistor and a capacitor for applying said electrical control signal across said base-emitter electrodes of said transistor in a polarity relationship which will initiate conduction through said collector-emitter electrodes thereof.

3. A fast rise electric trigger pulse circuit for producing a fast rise electric pulse for triggering a silicon controlled rectifier into an electrical load comprising in combination with a silicon controlled rectifier having an anode, a cathode and a gate electrode and a source of direct current potential;

control signal circuit means responsive to an externally generated electrical signal for producing an output electrical control signal of a substantially constant magnitude for a predetermined duration, means for applying an externally generated electrical signal to said control signal circuit means,
a normally not-conducting transistor having a control electrode and two current carrying electrodes,
first, second and third resistors,
means for connecting one of said resistor and said current carrying electrodes of said transistor across said source of direct current potential,
means for connecting the other two of said resistors in series across said source of direct current potential,
means for connecting said cathode electrode of said silicon controlled rectifier to the junction between said one resistor and said current carrying electrodes of said transistor,
means for connecting said gate electrodes of said silicon controlled rectifier to the junction between said other two series connected resistors,
means for connecting said cathode electrode of said silicon controlled rectifier to the negative polarity terminal of said source of direct current potential through said current carrying electrodes of said transistor,
coupling circuit means for applying said electrical control signal across said control electrode and a selected one of said current carrying electrodes of said transistor in a polarity relationship which will initiate conduction through said current carrying electrodes thereof, and
means included in said coupling circuit means for reducing the magnitude of said electrical control signal across said control electrode and a selected one of said current carrying electrodes of said transistor over a predetermined time interval.

4. A fast rise electric trigger pulse circuit for producing a fast rise electric pulse for triggering a silicon controlled rectifier into an electrical load comprising in combination with a silicon controlled rectifier having an anode, a cathode and a gate electrode and a source of direct current potential;
control signal circuit means responsive to an externally generated electrical signal for producing an output electrical control signal of a substantially constant magnitude for a predetermined duration,
means for applying an externally generated electrical signal to said control signal circuit means,
a normally not-conducting transistor having a control electrode and two current carrying electrodes,
first, second and third resistors,
means for connecting one of said resistors and said current carrying electrodes of said transistor across said source of direct current potential,
means for connecting the other two of said resistors in series across said source of direct current potential,
means for connecting said cathode electrode of said silicon controlled rectifier to the junction between said one resistor and said current carrying electrodes of said transistor,
means for connecting said gate electrode of said silicon controlled rectifier to the junction between said other two series connected resistors,
means for connecting said cathode electrode of said silicon controlled rectifier to the negative polarity terminal of said source of direct current potential through said current carrying electrodes of said transistor,
a fourth resistor,
a capacitor, and coupling circuit means including the parallel combination of said fourth resistor and said capacitor for applying said electrical control signal across said control electrode and a selected one of said current carrying electrodes of said transistor in a polarity relationship which will initiate conduction through said current carrying electrodes thereof.

5. A fast electric trigger pulse circuit for producing a fast rise electric pulse for triggering a silicon controlled rectifier into an electrical load comprising in combination with a silicon controlled rectifier having an anode, a cathode and a gate electrode and a source of direct current potential;
a multivibrator circuit having input and output circuit means of the type characterized by stable and alternate conditions of operation for producing an electrical control signal of a substantially constant magnitude for a predetermined duration across said output circuit means,
means for applying an externally generated electrical signal across said input circuit means of said multivibrator circuit for triggering said multivibrator circuit to the alternate condition of operation,
a normally not-conducting transistor having collector, emitter and base electrodes,
first and second resistors,
means for connecting each said gate electrode and said cathode electrode of said silicon controlled rectifier to the positive polarity terminal of said source of direct current potential through a respective one of said first and second resistors in parallel,
means for connecting said cathode electrode of said silicon controlled rectifier to the negative polarity terminal of said source of direct current potential through said collector-emitter electrodes of said transistor,
a third resistor,
a capacitor, and means for connecting said base electrode and said emitter electrode of said transistor across said output circuit means of said multivibrator circuit through the parallel combination of said third resistor and said capacitor.